United States Patent [19]
Lemelson

[11] 3,910,293
[45] Oct. 7, 1975

[54] TOOTH CLEANING IMPLEMENT
[76] Inventor: Jerome H. Lemelson, 85 Rector St., Metuchen, N.J. 08840
[22] Filed: Jan. 3, 1974
[21] Appl. No.: 430,395

[52] U.S. Cl. ............................................... 132/89
[51] Int. Cl. ............................................ A61c 15/00
[58] Field of Search .......... 132/89, 90, 88.7; 206/56

[56] References Cited
UNITED STATES PATENTS
| | | | |
|---|---|---|---|
| 1,491,818 | 4/1924 | Patino | 132/88.7 |
| 2,901,100 | 8/1959 | Mueller et al. | 206/56 |
| 3,177,879 | 4/1965 | Smith | 132/88.7 |

FOREIGN PATENTS OR APPLICATIONS
| | | | |
|---|---|---|---|
| 191,896 | 6/1923 | United Kingdom | 132/89 |

Primary Examiner—G. E. McNeill

[57] ABSTRACT

A hand held implement is provided for cleaning food from the crevices between teeth. The implement is preferably molded of plastic and is shaped with an elongated shank which preferably tapers to a narrow tip at one end for use as a conventional toothpick. The other end contains a head portion which is curved and protrudes outwardly from the shank. The head portion is rounded and is tapered and shaped in such a manner as to permit it to be engaged and worked in the crevices between the teeth to easily remove food therefrom.

10 Claims, 7 Drawing Figures

U.S. Patent Oct. 7,1975 3,910,293
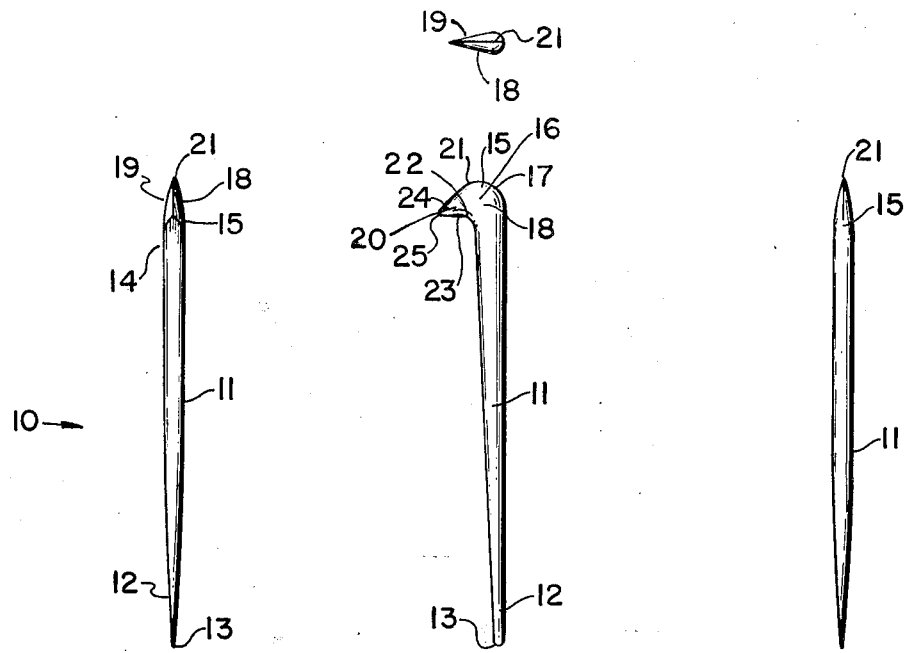
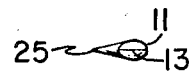
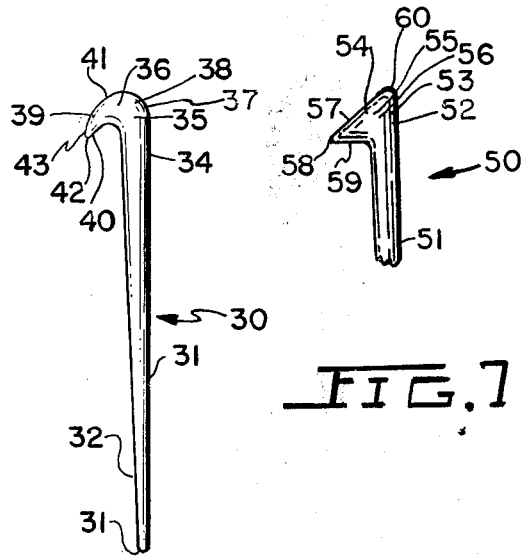

TOOTH CLEANING IMPLEMENT

SUMMARY OF THE INVENTION

This invention relates to new and improved structures in tooth cleaning implements which may be easily produced at low cost and are so shaped as to permit the use thereof with ease in removing food from the crevices which are defined between both the front and rear surfaces of the teeth. The implement is also shaped to permit it to be used in the manner of a conventional toothpick and additionally, to permit its use to impart a massaging action to the gums of the user both during ordinary use thereof and as an auxiliary function.

The conventional wooden or plastic toothpick is a straight, thin elongated implement which tapers almost to a point at either or both ends thereof. Food is removed from between the teeth by directly thrusting one end of the conventional toothpick into the tooth crevices, such as near the gums, and working the food both outwardly and towards the ends of the teeth. Such conventional toothpicks have a number of functional disadvantages which include the fact that they may easily penetrate and injury the gums of the user if they are not very carefully manipulated to avoid the gums, since they are thrust towards the gums during their cleaning operation. Furthermore, conventional toothpicks, due to their shape and length, may not be easily used to remove food from the crevices located between the rear surfaces of the teeth due to the fact that the entire length of the toothpick must be disposed within the mouth to permit the tip thereof to be properly angled towards the rear tooth crevices in order to properly remove food lodged between adjacent teeth.

The instant invention is directed to a structure in a tooth cleaning implement having a substantially elongated straight and preferably tapered shank which may be held between the thumb and forefinger of the hand and a specially shaped head portion which is configured with a tip portion which may easily be worked in the crevices between adjacent teeth close to the gums without the hazard of injuring the gums which is present in using the conventional toothpick. This is accomplished by providing the cleaning tip portion of the shank of the cleaning implement a short distance away from the shank and at an angle thereto such that the tooth cleaning operation may be accomplished while the shank is substantially parallel to or slightly angled with respect to the side walls of the teeth. In other words, when cleaning the rear crevices of the teeth, the upper portion of the shank containing the head of the implement of the instant invention, is held immediately adjacent the rear surface of the teeth while the major portion of the shank projects outwardly from the mouth of the user and is not necessarily thrust deep within the mouth as is required of the conventional toothpick so that the tip of the shank may be easily worked between the teeth without the danger of penetrating the gums of the user.

Accordingly, it is a primary object of this invention to provide a new and improved structure in a tooth cleaning implement which may be easily produced by molding a plastic material.

Another object is to provide a tooth cleaning implement which may be easily used to remove food from the crevices between the rear surfaces of teeth without the need for disposing a large portion of the implement or the hand of the user within the mouth.

Another object is to provide a tooth cleaning implement with a specially shaped head portion which is designed to permit the removal of food from between teeth with a minimum of hazard to the gums of the user.

Another object is to provide a tooth cleaning implement with a working head portion which is so shaped that it may not easily be distorted or broken, thereby eliminating the hazard of swallowing a broken portion.

Another object is to provide a tooth cleaning implement having a head portion for cleaning food from between teeth which is shaped to permit proper cleaning therewith yet is configured to reduce hazards to the gums which may be caused by irregularly shaped portions of the cleaning head.

Another object is to provide a tooth cleaning implement having a working head which may be used not only in an auxiliary gum massaging operation but will also massage the gums during its normal use.

With the above and such other objects in view as may hereinafter more fully appear, the invention consists of the novel constructions, combinations and arrangements of parts which will be more fully described and illustrated in the accompanying drawings, but it is to be understood that changes, variations and modifications may be resorted to which fall within the scope of the invention as claimed.

In the drawings:

FIG. 1 is a side view of a tooth cleaning implement having an elongated, straight, narrow shank with an integrally formed tooth cleaning head portion;

FIG. 2 is a front end view of the implement of FIG. 1;

FIG. 3 is a rear end view of the device of FIG. 1;

FIG. 4 is a top view of the device of FIG. 1;

FIG. 5 is a bottom view of the device of FIG. 1; and

FIG. 6 is a side view of a tooth cleaning implement which is a modified form of that shown in FIG. 1.

FIG. 7 is a modified form of the implements of FIGS. 1–6.

In FIGS. 1–5 is shown a tooth cleaning implement 10 which may be injection molded of a suitable plastic such as high impact polystyrene resin or other suitable resin having somewhat similar characteristics. The device 10 is shaped with an elongated tapered shank 11 having a lower portion 12 terminating at a tip portion 13, the end of which is tapered and rounded, as illustrated, and may be used in the manner of a conventional toothpick for removing food from between the crevices defined by the front walls of the teeth. The upper portion 14 of shank 11 is formed with a specially shaped head 15 which protrudes outwardly from one side of the shank.

The head 15 is formed with side walls 18 and 19 which slope or taper to a rounded rear portion 17 and a tapered front portion 20 which front portion terminates at a tip 24 which is employed to remove food from between the teeth in the manner described. The tip 24 is preferably rounded with a fine radius, rather than being pointed, to prevent penetration of the gums, and the radius thereof may vary from about 0.001 inch to 0.030 inch for suitable, efficient operation of the implement.

The central portion 16 of the head 15 smoothly tapers to an upper edge 21 which is arcuate in shape and extends from the far side of the head where it curves as a smooth extension of the upper end 14 of the shank 11. The upper edge 21 extends outwardly and downwardly towards the tip 24 terminating thereat and forming part of said tip.

The lower portion 22 of head 15 also tapers from the central portion 16 thereof to an edge 23 which also extends to and forms part of the tip 24. The end 25 of the tip, while illustrated as having a small radius which may be in the order of 0.003 inch to 0.030 inch, may also be pointed depending on the user's needs but such a pointed configuration will soon wear to a slightly rounded shape after some use of the implement when the tip 24 is used to break up and remove calice or tarter from between the teeth.

While the central portion 16 of the head 15 has its outer walls 18 and 19 preferably arcuately tapered towards the upper edge 21, lower edge 23 and tip 24, the major part of said central portion is sufficiently thick enough to resist being broken off due to the forces which are imparted to the head when the tip portion and particularly the lower edge 23 and the tapered sidewalls adjacent thereto, are engaged between adjacent teeth in the act of cleaning out food and removing tartar. Accordingly while the upper portion of the head tapers to an edge and decreases in thickness towards the tip 24, the major portion of the head, at least three quarters the length thereof, is preferably not less than at least half of the maximum thickness of the head which is equal to about the maximum thickness of the upper end of the shank and the implement itself.

FIG. 6 shows a tooth cleaning implement 30 having an elongated, straight shank 31 which tapers to a lower end portion 32 having a somewhat flat and rounded tip 33 as in the implement shown in FIGS. 1–5. The upper end 34 of shank 31 contains an integral head portion 35 which is a modified form of the head of the implement 10 of FIGS. 1–5. The central portion 36 of head 35 tapers from the rear portion 37 thereof towards a hook-shaped end portion 39. The sidewalls 38 of the head smoothly curve or taper both downwardly to a lower edge 40 and upeardly to an upper edge 41 both of which edges extend smoothly to the tip portion 42 of the end portion 39 and are joined to each other by a curved edge portion 43 having a slight radius which may vary from about 0.005 inch to about 0.050 inch.

The hook-like shape of the head 35 of FIG. 6 is provided to permit the tip portion thereof to be worked into the crevices at the rear of the front teeth while the shank 31, which is being held between the thumb and forefinger, protrudes directly outwardly from the mouth, thus eliminating the need to thrust the fingers directly into the mouth as is requisite in cleaning the rear of the teeth with a conventional toothpick. As with the implement of FIGS. 1–5, the implement of FIG. 6 may be easily used to clear food and remove tartar from behind the teeth without the necessity of widely opening the mouth to accomodate the fingers. and, due to their configurations, such implements may be used with minimum danger of injury to the gums.

In FIG. 7 is shown a modified form of the implements of FIGS. 1–6. The implement 50 is formed with a shank portion 51 which preferably tapers to an end portion of the type described above and has a head portion 53 at the upper end 52 thereof. The head 53 has a central portion 54 with sidewalls denoted 55 which taper towards a tip portion 58 of the type provided in the embodiment of FIG. 1. Head 53 also has its sidewalls tapering at the lower end thereof towards a lower edge 59 which lower edge is shown extending straight out from the shank 51. The upper end of head 53 tapers to an edge 57 which is straight and is angled downwardly from the upper end 60 of the head which is rounded as shown. The upper edge 57 preferably extends around the rounded upper end thereof and preferably has a radius between 0.005 inch and 0.050 inch to permit it to be used for cleaning purposes.

Typical and preferable dimensions of the tooth cleaning implements illustrated in FIGS. 1–7 comprise a length of about 3 inches which may vary from between 2 inches and 4 inches, a head thickness of about ⅛inch which may very from between 1/16 inch to 3/16 inch, a head length measured from the tip thereof to the far side of the upper portion of the shank of about ⅜inch may vary from about 3/16 inch to half an inch with the upper and lower portions of the head tapering to edges, as illustrated, which edges may be molded with slight radii of between 0.001 foot and 0.010 inch and the tip portion of the head being pointed or rounded with a radius between about 0.003 inch and 0.030 inch.

While the tooth cleaning implements of FIGS. 1–7 are primarily intended for tooth cleaning purposes, they may also be employed to massage the gums. For such applications, the entire implement or the head portions thereof may be injection molded of a yieldable or flexible plastic such as medium or low density polyethylene, ethylene vinyl acetate, styrene butadiene or other suitable resins. Either the entire head portion thereof or a portion of the head of the implement may be molded of such flexible resins which are either assembled to the remaining portion of the implement or molded integral therewith. Resins with Shore A hardness ratings between 25 and 50 may be double shot molded against the remainder of the head or shank of the implement molded of a more rigid plastic to form the flexible massaging portion including the tip or upper portion of the head which may be worked between and along the tooth crevices to clean same of soft food and massaged against the gums for hygienic purposes.

I claim:

1. A dental implement comprising:
    an elongated, substantially straight shank portion,
    a head portion integrally formed at one end of said elongated shank portion,
    said head portion protruding a short distance outwardly from one side of said shank portion and formed with a tooth cleaning portion thereof which is disposed away from said shank portion, said tooth cleaning portion having an end portion shaped with a single tip defining the outer end thereof,
    said head portion having side walls which taper both upwardly towards the upper end of said head to a first edge and downwardly to the lower part of said head portion to a second edge,
    said first and second edges of said head portion converging towards each other and extending to said end portion of said head where they join to form said tip and defining a slender, wedge-like end of said head which may be disposed in the crevices between the teeth near the gums and may be employed to remove and clean food lodged between said teeth.

2. A dental implement in accordance with claim 1 wherein said second edge extending along the lower part of said head portion extends substantially normal to the axis of said shank portion of said implement.

3. A dental implement in accordance with claim 2 wherein said second edge is radially curved downwardly in the vicinity of said shank portion and extends as a straight edge outwardly from the curved portion thereof to said tip at the outer end of said head.

4. A dental implement in accordance with claim 1 wherein said first edge of said head portion is arcuately curved and extends downwardly towards the tip at the outer end of said head.

5. A dental implement in accordance with claim 2 wherein said shank portion is tapered in shape towards the end thereof opposite the head end of the implement and is provided with a narrow tip at its end which tip may be used to remove food from between the teeth.

6. A dental implement in accordance with claim 1 which is between 2 inches and 4 inches in length and wherein said head portion extends between ⅛ inch and ½ inch outwardly from the shank portion of the implement.

7. A dental implement in accordance with claim 1 which is molded as an integral unit of a rigid polymer.

8. A dental implement in accordance with claim 1 wherein said head portion is hook-shaped in configuration.

9. A dental implement in accordance with claim 1 wherein a portion of the head portion thereof is formed of a flexible material capable of deforming when disposed between the teeth and against the gums.

10. A dental implement in accordance with claim 1 wherein the entire head portion of said implement is formed of a flexible material capable of deforming when pressed between the teeth and against the gums to permit it to be used as a massaging and tooth cleaning device.

* * * * *